United States Patent
Lim

(10) Patent No.: US 7,558,288 B2
(45) Date of Patent: Jul. 7, 2009

(54) LAYER-BASED MULTIPLE DATA PROCESSING APPARATUS AND METHOD

(75) Inventor: Yong-jun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 11/002,293

(22) Filed: Dec. 3, 2004

(65) Prior Publication Data

US 2005/0122975 A1 Jun. 9, 2005

(30) Foreign Application Priority Data

Dec. 3, 2003 (KR) ...................... 10-2003-0087250

(51) Int. Cl.
*H04J 3/16* (2006.01)
*H04J 3/22* (2006.01)
(52) U.S. Cl. ..................................... 370/469
(58) Field of Classification Search ................. 370/469, 370/389, 400–401, 465
See application file for complete search history.

(56) References Cited

U.S. PATENT DOCUMENTS

| 2003/0081600 A1* | 5/2003 | Blaker et al. ................. 370/389 |
| 2003/0223433 A1* | 12/2003 | Lee et al. ............... 370/395.52 |
| 2004/0100977 A1* | 5/2004 | Suzuki et al. ............... 370/401 |

* cited by examiner

*Primary Examiner*—Kevin C Harper
(74) *Attorney, Agent, or Firm*—Sughrue Mion, PLLC

(57) ABSTRACT

A method and apparatus for processing a plurality of data in a protocol module. The method includes (a) determining priorities of the plurality of data based on information on the plurality of data, and (b) driving a plurality of protocol modules, which process the plurality of data according to a predetermined protocol, based on the priorities determined in (a). Accordingly, it is possible to process the plurality of data at a high rate by constructing a plurality of Internet protocol (IP) layers and a plurality of a transmission control protocol/user datagram protocol (TCP/UDP) layers in a hardware manner without involvement of a processor.

16 Claims, 7 Drawing Sheets

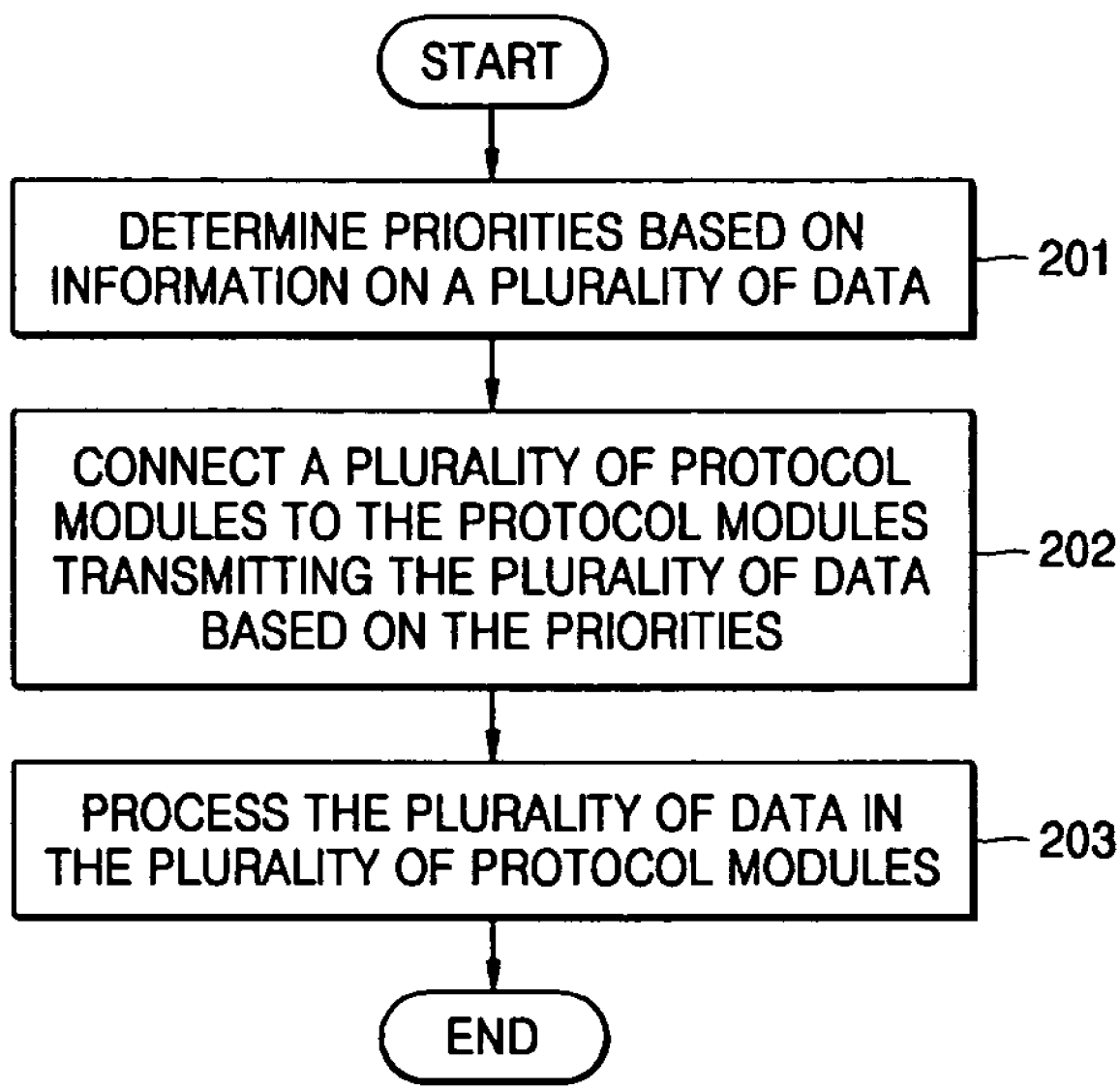

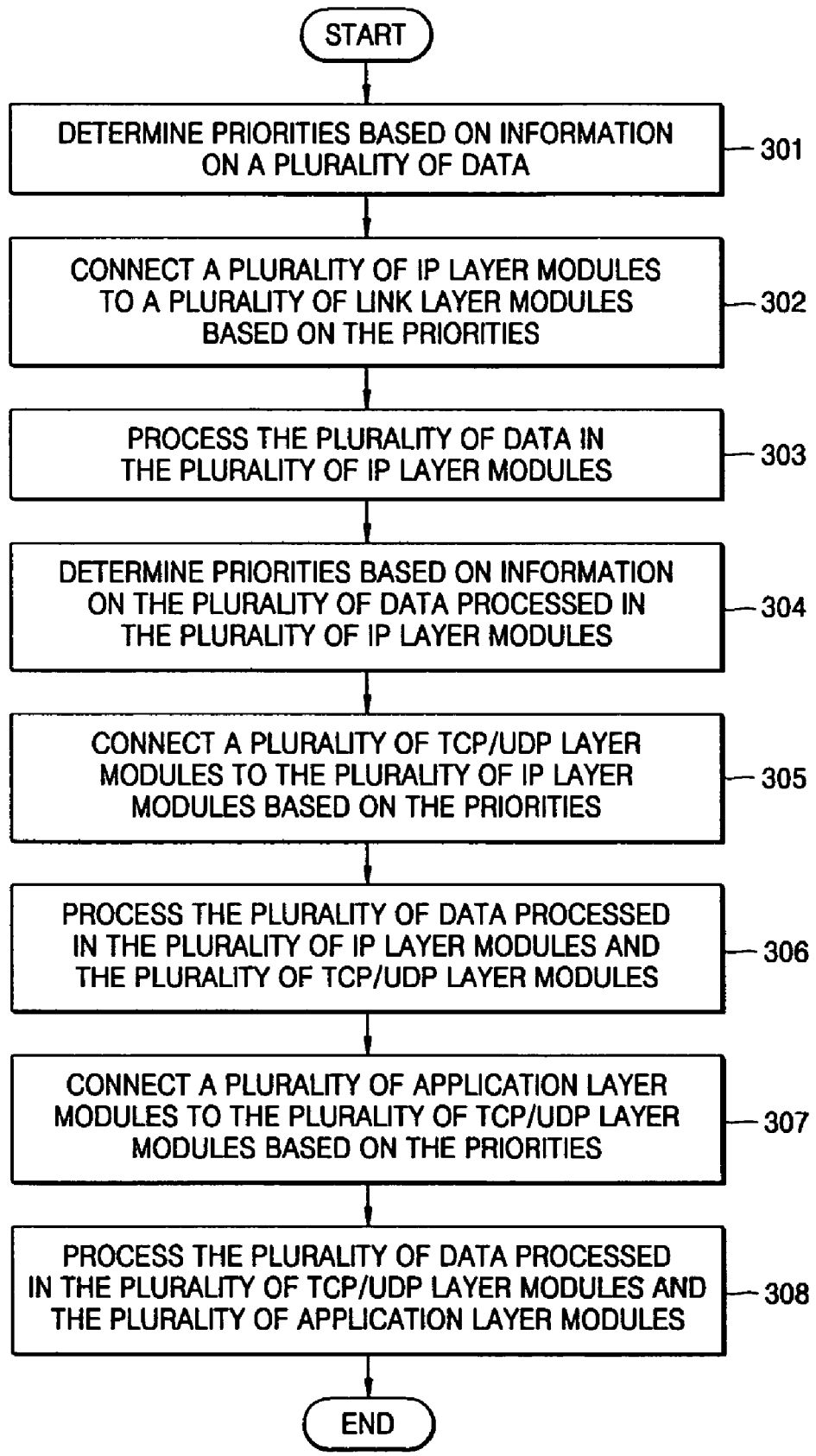

US 7,558,288 B2

LAYER-BASED MULTIPLE DATA PROCESSING APPARATUS AND METHOD

BACKGROUND OF THE INVENTION

This application claims the priority of Korean Patent Application No. 2003-87250, filed on Dec. 3, 2003, in the Korean Intellectual Property Office, the disclosure of which is incorporated herein in its entirety by reference.

1. Field of the Invention

The present invention relates to a protocol stack in accordance with an OSI (open system interconnection) reference model, and more particularly, to a data processing apparatus and method.

2. Description of the Related Art

FIG. 1 is a view illustrating a conventional protocol stack. The conventional protocol stack comprises a plurality of interfaces 11, 12, 13, and 14, an Internet protocol (IP) layer 2, a Transmission control protocol/user datagram protocol (TCP/UDP) layer 3, and a plurality of application layers 41, 42, 43, and 44.

The plurality of interfaces 11, 12, 13, and 14 are link layers in an open system interconnection (OSI) reference model and, for example, include a Local area network (LAN) interface 11, an IEEE (Institute of Electrical and Electronics Engineers) 1394 interface 12, a Universal serial bus (USB) interface 13, and a Wireless local area network (WLAN) interface 14. Each interface is a hardware component functioning as a link for physically connecting apparatuses on which the protocol stack shown in FIG. 1 is mounted in various networks such as LANs, IEEE 1394 networks, USB networks, and WLANs.

The IP layer 2 is a network layer in the OSI reference model. In the 1P layer 2, data received through the networks are integrated. In other words, when the data are received through the networks, an operating system of an apparatus on which the protocol stack shown in FIG. 1 is mounted transports an interrupt signal to network device drivers. The network device drivers receiving the interrupt signal start to process the data in accordance with the Internet protocol. Since the data are processed in a software manner, there is a problem that other tasks may be delayed in a processor of an apparatus on which the protocol stack shown in FIG. 1 is mounted. When a plurality of data are processed in a software manner in accordance with an IP protocol in network device drivers, since the network device drivers have different task configurations, the data received through the networks are replicated and stored in a memory. When the data is processed, "task switching" is performed. That is, task configuration for the data replicated and stored in the memory is formed and the data is processed. Since an additional time interval is required to replicate and store the data in the memory and to form the task configuration, there exists another problem involving delay. The delay may destroy isochronism for a multimedia data processing procedure.

The data processed in the IP layer 2 is transported to a TCP/UDP layer 3. Since the data are processed in the software manner in the TCP/UDP layer 3, the aforementioned problems still exist. The data processed in the TCP/UDP layer 3 is transported to and processed in application layers 41, 42, 43, and 44.

SUMMARY OF THE INVENTION

The present invention provides a multiple data processing apparatus and a method therefor, capable of processing a plurality of data at a high rate by constructing a plurality of IP layers and a plurality of TCP/UDP layers in a hardware manner without involvement of a processor.

According to one aspect of the present invention, there is provided a method of processing a plurality of data, the method comprising (a) determining priorities of the plurality of data based on information on the plurality of data, and (b) driving a plurality of protocol modules, which process the plurality of data according to a predetermined protocol, based on the priorities determined in (a).

According to another aspect of the present invention, there is provided an apparatus for processing a plurality of data, the apparatus comprising a priority determination unit determining priorities of the plurality of data based on information regarding the plurality of data, and a plurality of protocol module units having a plurality of protocol modules, which process the plurality of data according to a predetermined protocol, based on the priorities determined by the priority determination unit.

According to yet another aspect of the present invention, there is provided a method of hierarchically processing a plurality of data, the method including (a) determining priorities of the plurality of data based on information regarding the plurality of data, which are transmitted from a plurality of link layer modules and a plurality of application layer modules, respectively, and (b) driving a plurality of Internet protocol layer modules, which process the plurality of data according to an Internet protocol, respectively, based on the priorities determined by (a).

Because the apparatus or method according to the present invention functions as a network co-processor, the processor can perform other tasks as well as the network-related tasks. In addition, according to the present invention, it is possible to solve problems due to narrow bandwidths of a network. Furthermore, it is possible to improve overall system performance by processing higher and lower priority data in faster and slower IP or TCP/UDP layers, respectively.

BRIEF DESCRIPTION OF THE DRAWINGS

The above and other features and advantages of the present invention will become more apparent by describing in detail exemplary embodiments thereof with reference to the attached drawings in which:

FIG. 6 is a flowchart of a multiple data processing method according to an embodiment of the present invention; and FIG. 7 is a flowchart of a layer-based multiple data processing method according to an embodiment of the present invention.

DETAILED DESCRIPTION OF THE INVENTION

Figure 1:
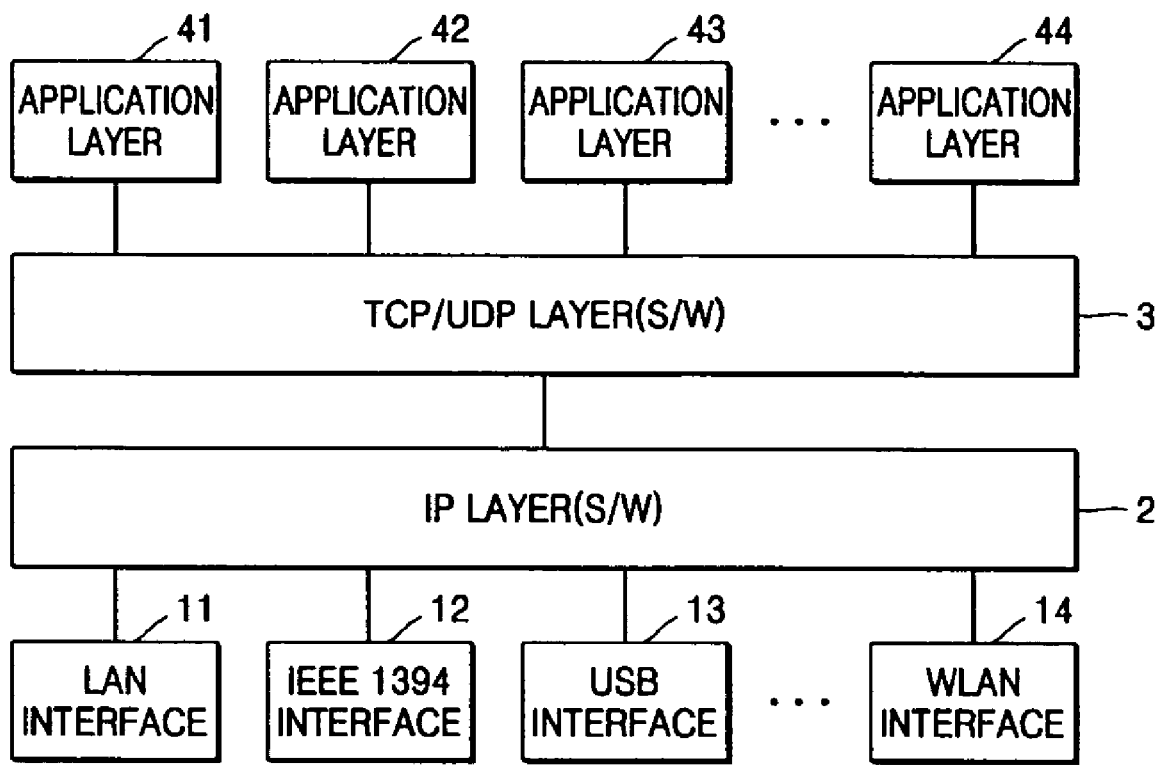
FIG. 1 is a view illustrating a conventional protocol stack.

The present invention and operational advantages thereof can be fully understood by referring to the accompanying drawings and explanations thereof.

Now, the exemplary embodiments of the present invention will be described with reference to the accompanying drawings to explain the present invention in detail. In the drawings, the same reference numerals indicate the same elements.

Figure 2:
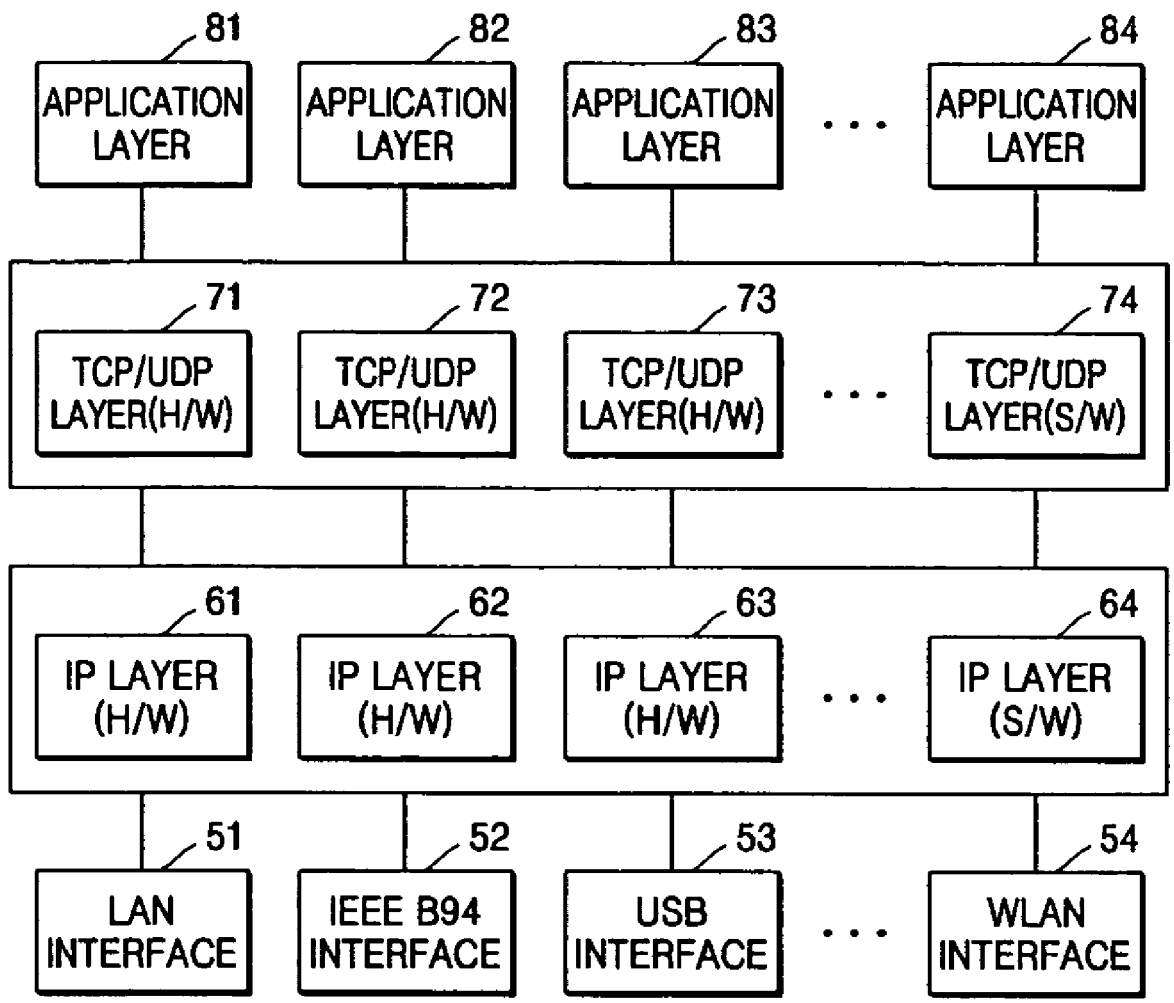
FIG. 2 is a view illustrating a multiple protocol stack according to an embodiment of the present invention.

FIG. 2 is a view illustrating a multiple protocol stack according to an embodiment of the present invention. Referring to FIG. 2, the multiple protocol stack comprises a plurality of interfaces 51, 52, 53, and 54, a plurality of Internet protocol (IP) layers 61, 62, 63, and 64, a plurality of Transmission control protocol/user datagram protocol (TCP/UDP) layers 71, 72, 73, and 73, and a plurality of application layers 81, 82, 83, and 84.

In the plurality of IP layers 61, 62, 63, 64, the IP layer 64 and the IP layers 61, 62, and 63 are constructed in software and hardware manners, respectively. The number of the IP layers is determined in consideration of the network configuration. That is, the more the number of IP layers increases, the more the number of data being processed at a time increases but the more cost and power consumption increases. Since the hardware IP layers 61, 62, and 63 process the data in a hardware manner without involvement of a processor of an apparatus on which the protocol stack shown in FIG. 1 is mounted, it is possible to prevent processing delay of other tasks of the processor and delays due to data replication and task switching.

In addition, since the plurality of IP layers 61, 62, 63, and 64 simultaneously process the plurality of data, it is possible to process the data at a fast processing rate. The hardware IP layers 61, 62, 63 have different processing rates depending on the quality of their own electric elements. The IP layer 61 has the fastest processing rate. The IP layers 62 and 63 have the second and third fastest processing rates, respectively. The software IP layer 64 has the slowest processing rate, since it processes the data in a software manner. The data received from the different networks have different processing priorities. For example, data being related to a hand-off or security procedure is processed prior to other data. In this case, the data is processed in the fastest IP layer 61.

Similar to the plurality of IP layers 61, 62, 63, and 64, the plurality of TCP/UDP layers 71, 72, 73, and 74 simultaneously process the data passing through the plurality of IP layers 61, 62, 63, and 64 in accordance with a TCP or UDP protocol. The TCP/UDP layer 74 processes the data in a software manner, and the other TCP/UDP layers 71, 72, and 73 process the data in a hardware manner. The processing rate increases from right to left layers in FIG. 2.

Figure 3:
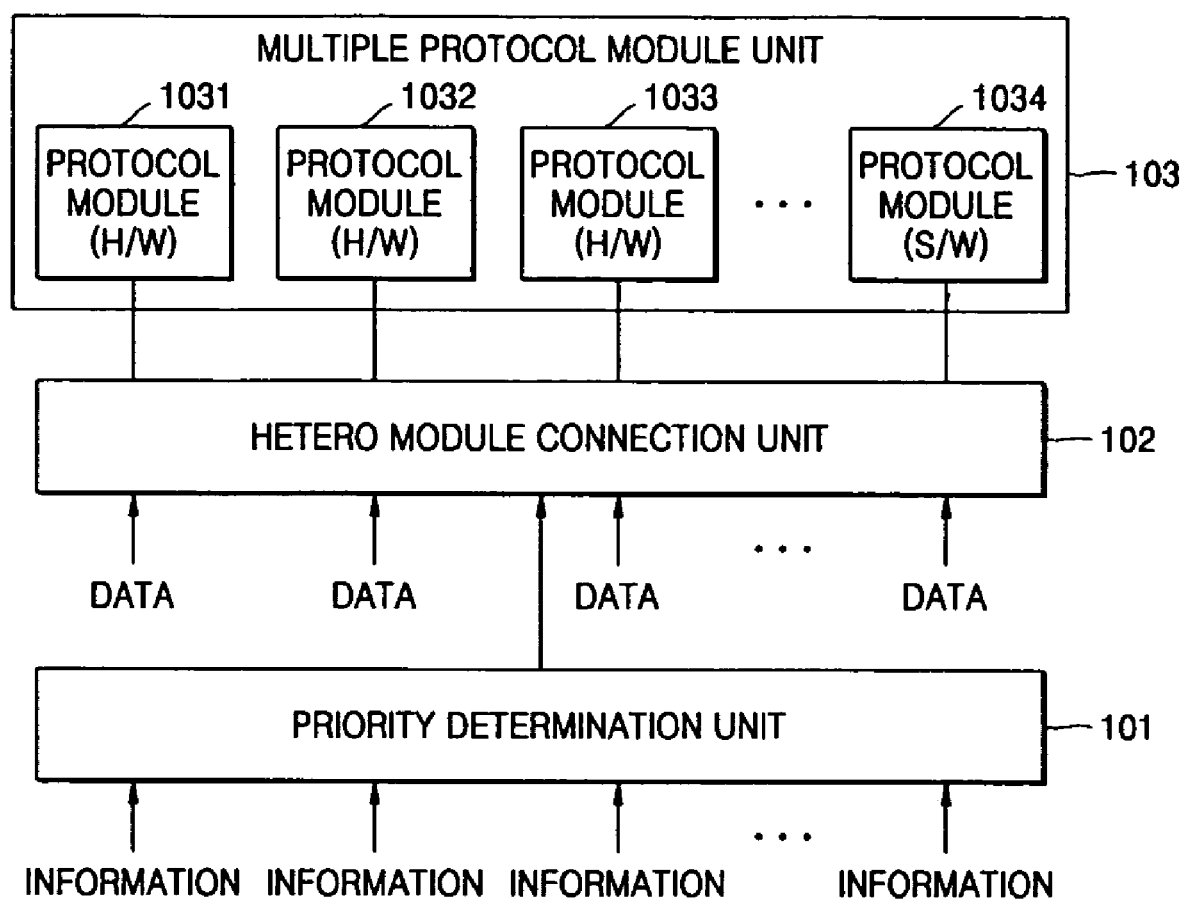
FIG. 3 is a structural view illustrating a multiple data processing apparatus according to an embodiment of the present invention.

FIG. 3 is a structural view illustrating a multiple data processing apparatus according to an embodiment of the present invention. Referring to FIG. 3, the multiple data processing apparatus comprises a priority determination unit 101, a hetero module connection unit 102, and a multiple protocol module unit 103. The multiple data processing apparatus is an embodiment of the apparatus on which the multiple protocol stack shown in FIG. 2 is mounted.

The priority determination unit 101 receives information on the plurality of data and determines priorities of the plurality of data based on the information on the plurality of data. In a case where information on some data represents that the data are related to the hand-off or security procedure, the data is determined to have a higher priority because it must be processed prior to other data.

The hetero module connection unit 102 receives the plurality of data, connects the plurality of protocol modules to modules transmitting the plurality of data based on the priorities determined by the priority determination unit 101, and transports the plurality of data to the plurality of protocol modules. In other words, a module transmitting the highest-priority data is connected to the fastest protocol module 1031, and a module transmitting the lowest-priority data is connected to the slowest protocol module 1034. The fastest protocol module 1031 is a module constructed with fast-rate electric elements in a hardware manner, and the slowest protocol module 1034 is a module constructed in a software manner.

The plurality of protocol modules 1031, 1032, 1033, and 1034 connected to the modules transmitting the plurality of data receive the plurality of data and process the received data in accordance with predetermined protocols. The multiple protocol module unit 103 comprises the plurality of protocol modules 1031, 1032, 1033, and 1034. In the multiple protocol module unit 103, the plurality of protocol modules 1031, 1032, 1033, and 1034 process the plurality of data at rates corresponding to the priorities of the plurality of data. In other words, the highest-priority data is processed by the fastest protocol module 1031, and the lowest-priority data is processed by the slowest protocol module 1034. The fastest protocol module 1031 processes the data in a hardware manner, and the slowest protocol module 1034 processes the data in a hardware manner.

Figure 4:
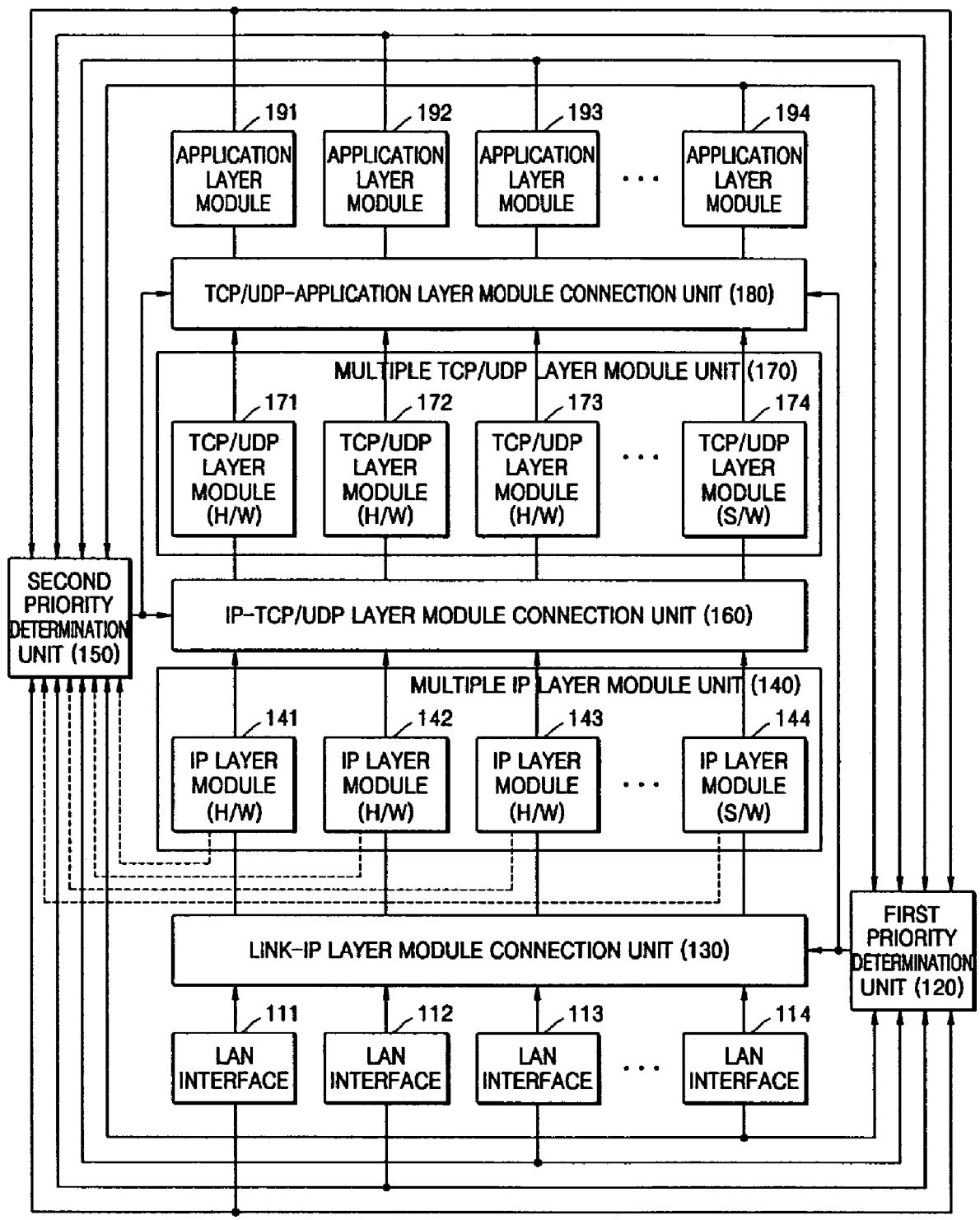
FIG. 4 is a structural view illustrating a layer-based multiple data processing apparatus according to an embodiment of the present invention.

FIG. 4 is a structural view illustrating a layer-based multiple data processing apparatus according to another embodiment of the present invention. Referring to FIG. 4, the layer-based multiple data processing apparatus comprises a plurality of link layer modules 111, 112, 113, and 114, a first priority determination unit 120, a link-IP layer module connection unit 130, a multiple IP layer module unit 140, a second priority determination unit 150, an IP-TCP/UDP layer module connection unit 160, a multiple TCP/UDP layer module unit 170, a TCP/UDP-application layer module connection unit 180, and a plurality of the application layer modules 191, 192, 193, and 194. The layer-based multiple data processing apparatus is an example of the apparatus on which the multiple protocol stack shown in FIG. 2 is mounted.

The first priority determination unit 120 receives information on the plurality of data from the plurality of link layer modules 111, 112, 113, and 114 and the plurality of application layer modules 191, 192, 193, and 194 and determines priorities of the plurality of data based on the information on the plurality of data. For example, when information on some data received from the plurality of link layer modules 111, 112, 113, and 114 indicates that the data are related to a quality-of-service (QOS) or hand-off procedure, the data is determined to have a higher priority because it must be processed prior to the general data. The QOS defines the service quality of the layers of an open system interconnection (OSI) reference model. The hand-off procedure has a function of automatically switching channels. Therefore, the QOS and hand-off procedures need to be previously performed in order to practically process the data. In addition, when information on some data received from the plurality of application layer modules 191, 192, 193, and 194 indicates that the data are related to the security or resolution procedure, the data is determined to have a higher priority because it must be processed prior to other general data. The security procedure has a function of preventing an unauthorized party from utilizing to-be-processed data, and the resolution procedure has a function of setting a display configuration before displaying video data. Therefore, the security and hand-off procedures need to be previously performed in order to practically process the data.

The link-IP layer module connection unit 130 receives the plurality of data from the plurality of link layer modules 111, 112, 113, and 114, connects the plurality of IP layer modules 141, 142, 143, and 144 to the plurality of link layer modules 111, 112, 113, and 114 based on the priorities determined by the first priority determination unit 120, and transports the plurality of data to the plurality of IP layer modules 141, 142, 143, and 144. In other words, the link layer module transmitting the highest-priority data is connected to the fastest IP layer module 141, and the link layer module transmitting the second-highest-priority data is connected to the second-fastest IP layer module 142. In addition, the link layer module transmitting the third-highest-priority data is connected to the third-fastest IP layer module 143, and the link layer module transmitting the lowest-priority data is connected to the slowest IP layer module 144. The fast-rate IP layer modules 141, 142, and 143 are constructed in a hardware manner. In particular, the fastest IP layer module 141 is constructed with fast-rate electric devices in a hardware manner. The slowest IP layer module 144 is constructed in a software manner.

The plurality of IP layer modules 141, 142, 143, and 144 that are connected to the plurality of link layer modules 111, 112, 113, and 114 transmitting the plurality of data, receive the plurality of data and process the plurality of data in accordance with the IP protocol. The multiple IP layer module unit 140 comprises the plurality of IP layer modules 141, 142, 143, and 144. In the multiple IP layer module unit 140, the plurality of IP layer modules 141, 142, 143, and 144 process the plurality of data at rates corresponding to the priorities of the plurality of data. In other words, the highest-priority data is processed by the fastest IP layer module 141. The second-highest-priority data is processed by the second-fastest IP layer module 142. The third-highest-priority data is processed by the third-fastest IP layer module 143. The lowest-priority data is processed by the slowest IP layer module 144.

The second priority determination unit 150 receives information on the data processed by the plurality of IP layer modules 141, 142, 143, and 144 from the plurality of link layer modules 111, 112, 113, and 114, the plurality of IP layer modules 141, 142, 143, and 144, and the plurality of application layer modules 191, 192, 193, and 194 and determines the priorities of the data processed by the plurality of IP layer modules 141, 142, 143, and 144 based on the information on the data processed by the plurality of IP layer modules 141, 142, 143, and 144. The priorities are determined with reference to information transmitted from the plurality of IP layer modules 141, 142, 143, and 144 in addition to the information transmitted from the plurality of link layer modules 111, 112, 113, and 114 and the plurality of application layer modules 191, 192, 193, and 194. Rather than the case of determining the priorities of the data to be processed in the IP layers, the data are processed in advance. Therefore, the priorities are accurately determined in consideration of the information on the IP layers. For example, when information on some data received from the plurality of IP layer modules 141, 142, 143, and 144 indicates that the data are related to the traffic class or the flow control, the data is determined to have a higher priority because it must be processed prior to other general data. The traffic class and the flow control are related to the priorities of data packets and the QOS, respectively. Therefore, the traffic class and the flow control need to be processed in advance in order to practically process the data.

The IP-TCP/UDP layer module connection unit 160 receives the data processed by the plurality of IP layer modules 141, 142, 143, and 144 from the plurality of IP layer modules 141, 142, 143, and 144, connects the plurality of TCP/UDP layer modules 171, 172, 173, and 174 to the plurality of IP layer modules 141, 142, 143, and 144 based on the priorities determined by the second priority determination unit, and transports the data processed by the plurality of IP layer modules 141, 142, 143, and 144 to the plurality of TCP/UDP layer modules 171, 172, 173, and 174.

The plurality of TCP/UDP layer modules 171, 172, 173, and 174 that are connected to the plurality of IP layer modules 141, 142, 143, and 144 receive the data processed by the plurality of IP layer modules 141, 142, 143, and 144 and process the received data in accordance with the TCP or UDP protocol. The multiple TCP/UDP layer module unit 170 comprises the plurality of TCP/UDP layer modules 171, 172, 173, and 174. The plurality of TCP/UDP layer modules 171, 172, 173, and 174 process the plurality of data at rates corresponding to the priorities of the plurality of data. In other words, the highest-priority data is processed by the fastest TCP/UDP layer module 171, and the second-highest-priority data is processed by the second-fastest TCP/UDP layer module 172. The third-highest-priority data is processed by the third-fastest TCP/UDP layer module 173. The lowest-priority data is processed by the slowest IP layer module 174.

The TCP/UDP-application layer module connection unit 180 receives the data processed by the plurality of TCP/UDP layer modules 171, 172, 173, and 174 from the plurality of TCP/UDP layer modules 171, 172, 173, and 174, connects the plurality of application layer modules to the plurality of TCP/UDP layer modules 171, 172, 173, and 174 based on the priorities determined by the first and second priority determination units 120 and 150, and transports the data processed by the plurality of TCP/UDP layer modules 171, 172, 173, and 174 to the connected application layer modules 191, 192, 193, and 194. Although the connection between software protocol modules can be sufficiently constructed with software socket interfaces similar to the conventional techniques, the connection between hardware and software protocol modules cannot be sufficiently constructed with the software socket interfaces. For the connection between hardware and software protocol modules, hardware socket interfaces and wrappers are additionally required. Each wrapper has a function of connecting the hardware and software socket interfaces. Since the TCP/UDP-application layer module connection unit 180 connects the hardware or software protocol modules (TCP/UDP layer modules) to the software protocol modules (application layer modules), it requires software and hard socket interfaces and wrappers. In addition, although the IP or TCP/UDP layer modules are sufficiently connected in a hardware manner, the application layer modules must be connected in a software manner. This will be described in detail with reference to FIG. 5.

The plurality of application layer modules 191, 192, 193, and 194 connected to the plurality of TCP/UDP layer modules 171, 172, 173, and 174 receive data from the plurality of TCP/UDP layer modules 171, 172, 173, and 174 and process the data processed by the plurality of TCP/UDP layer modules 171, 172, 173, and 174 in accordance with the individual application protocols. The multiple application layer module unit comprises the plurality of the application layer modules 191, 192, 193, and 194.

Figure 5:
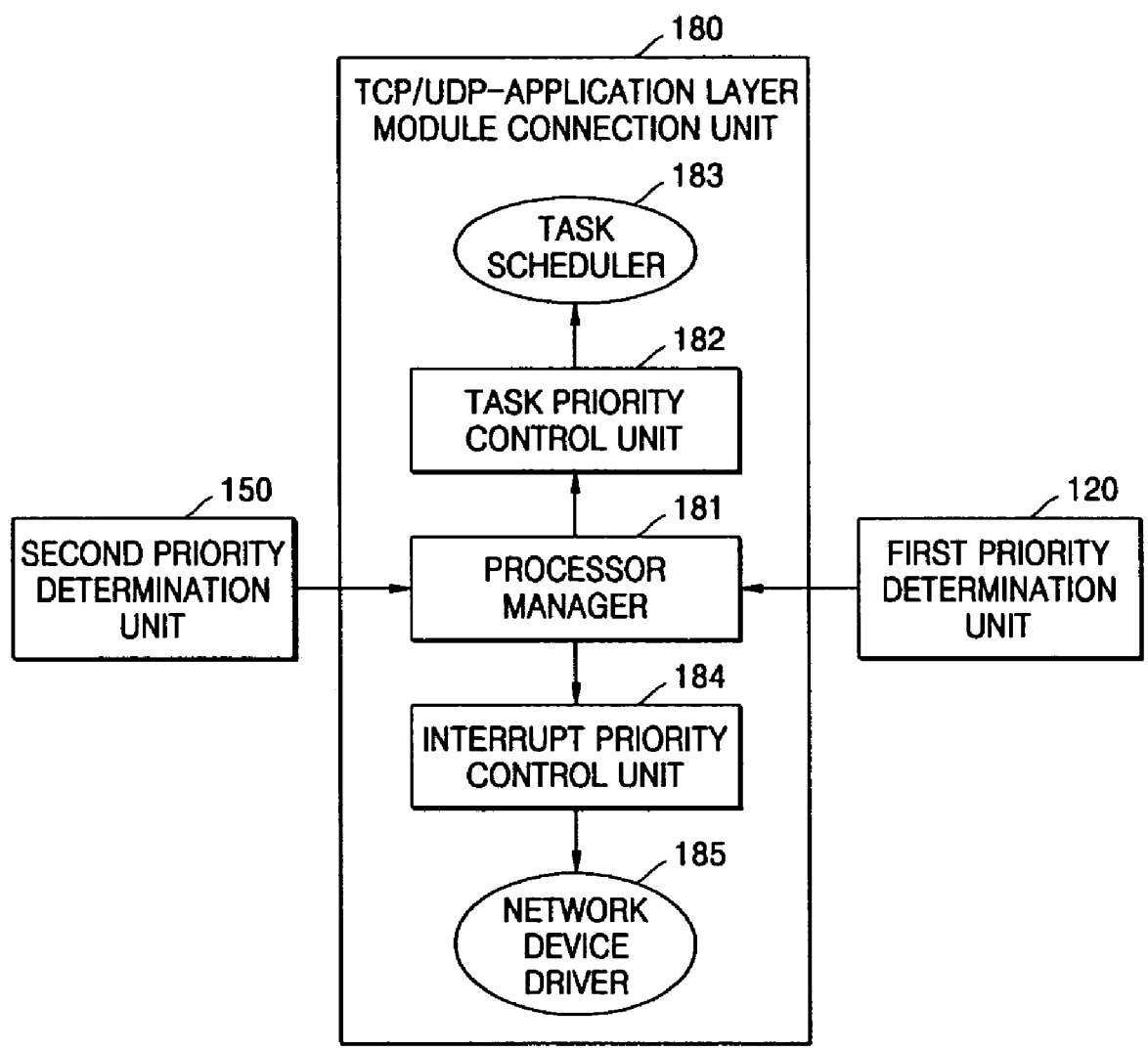
FIG. 5 is a detailed view of a TCP/UDP-application layer module connection unit shown in FIG. 4.

FIG. 5 is a detailed view of a TCP/UDP-application layer module connection unit 180 shown in FIG. 4.

Referring to FIG. 5, the TCP/UDP-application layer module connection unit 180 comprises a processor manager 181, a task priority control unit 182, a task scheduler 183, an interrupt priority control unit 184, and a network device driver 185.

The processor manager 181 determines a processing order of the plurality of data based on the priorities of the first and second priority determination units 120 and 150 and transports information on the processing order to the task priority control unit 182 and the interrupt priority control unit 184.

The task priority control unit 182 receives the information on the processing order on the plurality of data, dynamically adjusts the priorities of the tasks for the plurality of data based on the received information, and transports information on the priorities to the task scheduler 183. The task scheduler 183 adjusts the priorities of the application layer modules by scheduling the tasks based on the priorities.

The interrupt priority control unit 184 receives the information on the processing order on the plurality of data, dynamically adjusts the priorities of the interrupt service in the network device driver 185 for the plurality of data based on the received information, and transports the information on the priorities to the network device driver 185. The network device driver 185 adjusts the priorities of the application layer modules by scheduling the network devices based on the priorities.

The plurality of application layer modules can be suitably connected to the plurality of TCP/UDP layer modules by adjusting the priorities of the application layer module in the task scheduler 183 and the network device driver 185.

FIG. 6 is a flowchart of a multiple data processing method according to another embodiment of the present invention. Referring to FIG. 6, in the multiple data processing method, information on a plurality of data is received, and priorities of the plurality of data are determined based on the information on the plurality of data (operation 201). When information on some data indicates that the data are related to the hand-off or security procedure, the data is determined to have a higher priority because it must be processed prior to other data.

Next, the plurality of data are received, the plurality of protocol modules are connected to the modules transmitting the plurality of data based on the priorities determined in operation 201, and the plurality of data are transported to the plurality of protocol modules (operation 202). In other words, the module transmitting the higher-priority data is connected to the faster-rate protocol module, and the module transmitting the lower-priority data is connected to the slower-rate protocol module.

Next, the plurality of protocol modules receive the plurality of data and process the received data in accordance with predetermined protocols (operation 203). The plurality of protocol modules process the plurality of data at rates corresponding to the priorities of the plurality of data. In other words, the higher-priority data is processed by the faster-rate protocol module, and the lower-priority data is processed by the slower-rate protocol module. The faster-rate protocol module processes the data in a hardware manner, and the slower-rate protocol module processes the data in a software manner.

FIG. 7 is a flowchart of a layer-based multiple data processing method according to another embodiment of the present invention. Referring to FIG. 7, in the layer-based multiple data processing method, information on the plurality of data is received from a plurality of link layer modules and a plurality of application layer modules, and priorities of the plurality of data are determined based on the information on the plurality of data (operation 301). For example, when information on some data received from the plurality of link layer modules indicates that the data are related to the QOS or hand-off procedure, the data is determined to have a higher priority because it must be processed prior to the general data. In addition, when information on some data received from the plurality of application layer modules indicates that the data are related to the security or resolution procedure, the data is determined to have a higher priority because it must be processed prior to other general data.

Next, the plurality of data are received from the plurality of link layer modules, a plurality of IP layer modules are connected to the plurality of link layer modules based on the determined priorities, and the plurality of data are transported to the plurality of IP layer modules (operation 302). In other words, the link layer module transmitting the highest-priority data is connected to the fastest IP layer module, and the link module transmitting the second-highest-priority data is connected to the second-fastest IP layer module. The link layer module transmitting the third-highest-priority data is connected to the third-fastest IP layer module. The link layer module transmitting the lowest-priority data is connected to the slowest IP layer module.

Subsequently, the plurality of IP layer modules receive the plurality of data and process the plurality of data in accordance with the IP protocol (operation 303). The plurality of IP layer modules process the plurality of data at rates corresponding to the priorities of the plurality of data. In other words, the highest-priority data is processed by the fastest IP layer module, and the second-highest-priority data is processed by the second-fastest IP layer module. The third-highest-priority data is processed by the third-fastest IP layer module. The lowest-priority data is processed by the slowest IP layer module. The faster-rate IP layer module processes the data in a hardware manner, and the slower-rate IP layer module processes the data in a software manner.

Next, information on the data processed by the plurality of IP layer modules are received from the plurality of link layer modules, the plurality of IP layer modules, and the plurality of application layer modules, and priorities of the data processed by the plurality of IP layer modules are determined based on the information on the data processed by the plurality of IP layer modules (operation 304). Rather than the case of determining the priorities of the data to be processed in the IP layers, the data are previously processed in the IP layers, thus affecting the priorities. Therefore, the priorities are accurately determined considering the information on the IP layers. For example, when information on some data received from the plurality of IP layer modules 141, 142, 143, and 144 indicates that the data are related to the traffic class or the flow control, the data is determined to have a higher priority because it must be processed prior to other general data.

Next, the data processed by the plurality of IP layer modules are received from the plurality of IP layer modules, and the plurality of TCP/UDP layer modules are connected to the plurality of IP layer modules based on the determined priorities, and the data processed by the plurality of IP layer modules are transported to the plurality of TCP/UDP layer modules (operation 305).

Next, the plurality of TCP/UDP layer modules receive the data processed by the plurality of IP layer modules and process the data processed by the plurality of IP layer modules in accordance with the TCP or UDP protocol (operation 306). The plurality of TCP/UDP layer modules process the plurality of data at rates corresponding to the priorities of the plurality of data. In other words, the highest-priority data is processed by the fastest TCP/UDP layer module, and the second-highest-priority data is processed by the second-fastest TCP/UDP layer module. The third-highest-priority data is processed by the third-fastest TCP/UDP layer module. The lowest-priority data is processed by the slowest IP layer module.

Next, the data processed by the plurality of TCP/UDP layer modules are received from the plurality of TCP/UDP layer modules, the plurality of application layer modules are connected to the plurality of TCP/UDP layer modules based on the determined priorities, and the data processed by the plurality of TCP/UDP layer modules are transported to the connected application layer modules (operation 307).

Finally, the plurality of application layer modules receive the data processed by the plurality of TCP/UDP layer modules, and process the data processed by the plurality of TCP/UDP layer modules in accordance with the individual application protocols (operation 308).

On the other hand, embodiments of the present invention may be implemented with a program executed in a computer. The program may be recorded on a computer-readable recording medium and executed on a general computer.

The computer-readable recording medium includes a magnetic storage medium such as a ROM, a floppy disk, and a hard disk, and an optical readable medium such as a CD ROM and a DVD ROM. In addition, a carrier wave download scheme such as Internet transmission may be employed.

According to the present invention, it is advantageously possible to process a plurality of data at a high rate by constructing a plurality of IP layers and a plurality of TCP/UDP layers in a hardware manner without involvement of a processor. As a result, it is possible to prevent processing delay of other tasks of the processor and delays due to data replication and task switching. Therefore, it is possible to solve the problem in the prior art that isochronism for a multimedia-data processing procedure cannot be satisfied. By solving the problems, it is advantageous to smoothly process AV streaming, which is a large amount of data streaming. That is, because the apparatus or method according to the present invention functions as a network co-processor, the processor can perform other tasks as well as the network-related tasks. In addition, according to the present invention, it is possible to solve problems due to narrower bandwidths of a network. Furthermore, it is possible to improve overall system performance by processing higher and lower priority data in faster and slower IP or TCP/UDP layers, respectively.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing a plurality of data, comprising:
   (a) determining priorities of the plurality of data based on information on the plurality of data; and
   (b) driving a plurality of protocol modules, which process the plurality of data according to a predetermined protocol, based on the priorities determined in (a),
   wherein the plurality of protocol modules process the plurality of the data at rates corresponding to the determined priorities, respectively.

2. The method of claim 1, wherein the predetermined protocol is one of an Internet protocol and a transmission control protocol/user datagram protocol (TCP/UDP).

3. The method of claim 1, wherein parts of the plurality of protocol modules process parts of the plurality of data in a hardware manner, and the remaining parts of the plurality of protocol modules process the remaining pans of the plurality data in a software manner.

4. The method of claim 1, further comprising (c) connecting the plurality of protocol modules to a plurality of modules based on the priorities, respectively,
   wherein during (b), the plurality of protocol modules, which process data transmitted from the plurality of modules connected in (c), respectively, are driven.

5. An apparatus for processing a plurality of data, comprising:
   a priority determination unit determining priorities of the plurality of data based on information regarding the plurality of data; and
   a plurality of protocol module units having a plurality of protocol modules, which process the plurality of data according to a predetermined protocol, based on the priorities determined by the priority determination unit,
   wherein the plurality of protocol modules process the plurality of the data at rates corresponding to the priorities, respectively.

6. The apparatus of claim 5, wherein the predetermined protocol is one of an Internet protocol and a transmission control protocol/user datagram protocol (TCP/UDP).

7. The apparatus of claim 5, wherein parts of the plurality of protocol modules of the plurality of protocol module units process a portion of the plurality of data in a hardware manner, and the remaining parts of the plurality of protocol modules process a remaining portion of the plurality data in a software manner.

8. The apparatus of claim 5, further comprising a hetero module connection unit connecting the plurality of protocol modules to a plurality of modules based on the priorities,
   wherein the plurality of protocol modules of the plurality of protocol module units process data transmitted from the plurality of modules connected by the hetero module connection unit, respectively.

9. A method of hierarchically processing a plurality of data, comprising:
   (a) determining priorities of the plurality of data based on information regarding the plurality of data, which are transmitted from a plurality of link layer modules and a plurality of application layer modules, respectively; and
   (b) driving a plurality of Internet protocol layer modules, which process the plurality of data according to an Internet protocol, respectively, based on the priorities determined in the step (a),
   wherein the plurality of Internet protocol layer modules process the plurality of the data at rates corresponding to the determined priorities, respectively.

10. The method of claim 9, further comprising (c) connecting
    the plurality of Internet protocol layer modules to the plurality of link layer modules based on the priorities determined in (a), respectively,
    wherein during (b), the plurality of Internet protocol layer modules, which process the information transmitted from the plurality of link layer modules connected in (c), respectively, are driven.

11. The method of claim 9, further comprising:
    (c) determining priorities of the plurality of data processed by the plurality of Internet protocol layer modules, respectively, based on the information transmitted from the plurality of link layer modules, the plurality of Internet protocol layer modules, and the plurality of application layer modules; and
    (d) driving a plurality of transmission control protocol/user datagram protocol (TCP/UDP) layer modules, which process the data processed by the plurality of Internet protocol layer modules according to a transmission control protocol/user datagram protocol (TCP/UDP), respectively, based on the priorities determined in the step (c).

12. The method of claim 11, further comprising (e) connecting the plurality of TCP/UDP layer modules to the plurality of Internet protocol layer modules based on the priorities determined in the step (c), respectively,
  wherein during the step (d), the plurality of TCP/UDP layer modules which process the data transmitted from the plurality of Internet protocol layer modules connected in the step (e) are driven.

13. The method of claim 11, further comprising (e) driving the plurality of application layer modules, which process the data processed by the plurality of TCP/UDP layer modules according to respective application protocols, based on the priorities determined in (a) and the priorities determined in (c).

14. The method of claim 13, further comprising (f) connecting the plurality of application layer modules to the TCP/UDP layer modules based on the priorities determined in the step (a) and the priorities determined in the step (c), respectively.

15. A computer readable recording medium for recording a program that executes a method of processing a plurality of data, wherein the method comprises:
  determining priorities of the plurality of data based on information regarding the plurality of data; and
  driving a plurality of protocol modules, which process the plurality of data according to a predetermined protocol, respectively, based on the determined priorities,
  wherein the plurality of protocol modules process the plurality of the data at rates corresponding to the determined priorities, respectively.

16. A computer readable recording medium for recording a program that executes a method of hierarchically processing a plurality of data, wherein the method comprises:
  determining priorities of the plurality of data based on information regarding the plurality of data transmitted from a plurality of link layer modules and a plurality of application layer modules, respectively; and
  driving a plurality of Internet protocol layer modules, which process the plurality of data according to a predetermined protocol, respectively, based on the determined priorities,
  wherein the plurality of Internet protocol layer modules process the plurality of the data at rates corresponding to the determined priorities, respectively.

* * * * *